(12) United States Patent
Okmianski (10) Patent No.: US 6,978,447 B1
(45) Date of Patent: Dec. 20, 2005

(54) METHOD AND SYSTEM FOR EFFICIENTLY INTERPRETING A COMPUTER PROGRAM

(75) Inventor: Anton Okmianski, Lincoln, MA (US)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 09/796,870

(22) Filed: Feb. 28, 2001

(51) Int. Cl.[7] .............................................. G06F 9/45
(52) U.S. Cl. .......................... 717/139; 717/148; 718/1; 718/100; 719/311
(58) Field of Search ........................ 717/139; 719/311; 718/105, 1, 100, 101

(56) References Cited

U.S. PATENT DOCUMENTS

| | | | |
|---|---|---|---|
| 5,889,996 A * | 3/1999 | Adams ........................ | 717/139 |
| 6,209,018 B1 * | 3/2001 | Ben-Shachar et al. ...... | 718/105 |
| 6,223,202 B1 * | 4/2001 | Bayeh ........................ | 718/102 |
| 6,256,637 B1 * | 7/2001 | Venkatesh et al. ...... | 707/103 Y |
| 6,481,006 B1 * | 11/2002 | Blandy et al. .............. | 717/139 |
| 6,643,708 B1 * | 11/2003 | Francis et al. ............. | 709/246 |
| 2003/0200254 A1 * | 10/2003 | Wei ............................ | 709/203 |

OTHER PUBLICATIONS

Chunlin, Li, "A Java-based Mehtod for Developing Web Application System", Oct. 1999, p. 1079-1082, retrieved Mar. 15, 2004 from IEEE database.*

Walczowski, L.T. and Waller, W.A.J., "Java Servlet Technology for Analogue Module Generation", IEEE 1999, p. 1717-1720, retrieved Mar. 15, 2004 from IEEE database.*

"Method for disbributin load of JAVA application server using JAVA servlet in web enironment", Derwent, 200175, Copyright 1999 Derwent Information Ltd., 2 pages, retrieved from EAST 1.4.1 search engine Mar. 11, 2004.*

"The JAVA Servlet API White Paper", Sun Microsystems, Inc., retrieved from google.com search Mar. 11, 2004. www.java.sun.com.*

K. Arnold, et al., "The JAVA Programming Language," 1996, Chapter 1, pp. 1-27.

Daemon Consulting, Inc., "CGI::SpeedyCGI-Speed up perl CGI scripts by running them persistently," http://www.daemonic.com/SpeedyCGI.

* cited by examiner

*Primary Examiner*—Tuan Dam
*Assistant Examiner*—Mary Steelman
(74) *Attorney, Agent, or Firm*—Hickman Palermo Truong & Becker, LLP

(57) ABSTRACT

A method and a system are provided for efficiently executing computer programs that require invocation of an interpreter. A name of a program to be interpreted or executed is received, with zero or more arguments, at an interface client element. The interface client element may be implemented as a compact software element that is invoked using a command-line command. The interface client passes the program name and arguments to a server process that includes an interpreter. The server process provides the name and arguments to the interpreter. Interpretation results are received and passed back to the interface client. Efficient start-up is achieved for small, interpreted application programs for which start-up overhead exceeds the resources required to execute the programs. Embodiments are applicable to JAVA and to any computer programming language that can be used to write the server process, and that can dynamically instantiate and execute program code.

20 Claims, 7 Drawing Sheets

METHOD AND SYSTEM FOR EFFICIENTLY INTERPRETING A COMPUTER PROGRAM

FIELD OF THE INVENTION

The present invention relates to interpretation of computer programs, and relates more specifically to a method and system for more efficient startup of interpreted computer programs.

BACKGROUND OF THE INVENTION

Many computer programs are created using high-level source programming languages that have English-like syntax. However, a computer cannot directly execute the source text of the program expressed in such languages ("source code"). Instead, two main approaches are used to transform the source code into machine-executable code. In one approach, known as compilation, the source code is provided to a compiler, which parses the source code, carries out lexical analysis and syntax analysis, and generates machine-executable object code for later execution. Often such analysis and code generation requires the processor to make multiple passes through the source code. One disadvantage of this approach is that the compiled code typically is executable using only one processor type or processor family; a second disadvantage is that a processor must carry out the entire compilation process before it can begin executing the code. Examples of languages that use this approach are C and C++.

In a second approach, known as interpretation, the source code is provided to an interpreter. In interpretation, two sub-approaches are generally used. In the "pure interpretation" approach, there is no visible intermediate code processing stage; the program code requires no special pre-processing and is received as-is by the interpreter, which interprets it directly. Examples of such languages are PERL® and JavaScript®.

In the other sub-approach, the source code is converted to an intermediate code representation, which is then interpreted. For example, in a first phase of operation, the interpreter makes a single pass over the source code and converts each source code instruction into one or more corresponding intermediate language instructions. In a second phase of operation, the interpreter executes the intermediate language instructions. An example of a computer language that uses this approach is JAVA®, developed by Sun Microsystems, Inc.; in JAVA the intermediate language consists of "byte codes" that are executed, at run time, by a JAVA Virtual Machine. The source program code is first compiled into intermediate language instructions represented in byte codes. The interpreter takes the pre-processed code and translates it into specific low-level operating system instructions on the fly.

An advantage of this approach is that a JAVA Virtual Machine that is compatible with a particular processor family can directly execute any JAVA program, without the need for a compilation stage. However, the JAVA interpretation approach also has disadvantages. For example, every time a JAVA application is started, the JAVA Virtual Machine must first start executing. Unfortunately, there are costs associated with startup of the JAVA Virtual Machine, in terms of time, memory and processor resources, which degrade startup performance of the application. These startup costs include the allocation of memory, the creation of internal data structures, and the initialization of these structures. Collectively these processes impose significant and undesirable overhead.

In some contexts, the performance degradation associated with these startup costs is significant. The problem is especially evident when the expected running time of the program is small and the program is invoked frequently over a period of time. In such scenarios, the startup time of the application can become as resource-intensive and time consuming as running the program itself.

For example, one problem involved in interpretation of JAVA programs relates to development of large, complex computer application programs. Development of such programs, e.g., by professional software engineers, may involve creating numerous individual programs and then combining them into the complete application. The engineers may have thousands or tens of thousands of source code elements in various files or directories. During the course of software development, engineers have to compile an entire application often to verify that it compiles and works correctly. This compilation process is often accomplished with the use of scripts called "makefiles," and in a typical approach this involves running the JAVA compiler repetitively for each directory that contains source code files. However, because the Sun Microsystems JAVA compiler is written in the JAVA language and therefore executes in the JAVA Virtual Machine, every time the JAVA compiler is started, the JAVA Virtual Machine is started again. This results in unacceptable overhead and inefficient startup throughout the compilation process.

As another example, the UNIX operating environment consists of many small programs each dedicated to specific purpose. For example, a program that implements the command "ls" prints the list of files in the directory. This command carries out a simple task and is expected to execute fast. However, implementation of a program of the nature of "ls" as a JAVA program is presently impractical because the overhead of starting the JAVA Virtual Machine is larger than the time or other resources needed to execute the program itself. Thus, there is a need for a way to write programs in JAVA that would otherwise be impractical.

Several past attempts have been made to solve this problem. One approach is known as SpeedyCGI, and provides a way of running Common Gateway Interface (CGI) PERL scripts persistently. SpeedyCGI is described in the "daemoninc" dot corn Web site. After a PERL script is initially run, instead of exiting, SpeedyCGI keeps the PERL interpreter in memory. During subsequent runs, the interpreter is used to handle new requests, instead of starting a new PERL interpreter for each execution.

However, SpeedyCGI has many limitations and drawbacks. For example, SpeedyCGI requires modification and recompilation of the interpreter environment. This also means that SpeedyCGI has to be recompiled for every different version or release of the PERL interpreter. This approach is not readily adaptable to other environments, such as the JAVA programming environment, in which the developer of JAVA (Sun Microsystems) places contractual restrictions on re-distribution of modified JAVA Virtual Machine implementations.

Also, SpeedyCGI is restricted to running on one machine. Since SpeedyCGI is restricted to running on one machine, it cannot utilize resources from multiple machines. All resources must reside on the same machine as the client and the server. Furthermore, it currently only operates on selected computer platforms.

Additional known disadvantages of SpeedyCGI are that it can only run one program at a time on any particular server interpreter. If the server interpreter is busy processing running one application and receives a request to run another instance of the application or a different application, it has to start a new server interpreter.

JAVA web application servers have attempted to address scalability of JAVA applications. An example of such a server is Inprise Application Server 4. However, such servers only can be invoked from a browser or through a complicated mechanism such as Common Object Request Broker Architecture (CORBA). There is a need for a way to call and interpret source programs from a command line rather than using a browser or mechanism such as CORBA. Web application servers also are typically bulky, require complex installation and are generally very expensive.

Based on the foregoing, there is a need for an improved method of efficiently starting an interpreter for computer programs written in an interpreted language such as JAVA.

There is a specific need for a way to improve the startup efficiency of JAVA interpreted programs that are either started repeatedly and frequently, or consist of small programs, where startup overhead can be greater than the time or resources needed to execute the program itself.

There is a specific need for a method and system that addresses the limitations of SpeedyCGI and JAVA web application servers. For example, there is a need for a way to efficiently interpret computer programs in a way that does not require all elements of the interpreter system to reside or execute on the same machine, to interpret multiple programs at once, and to support command-line invocation of the interpreter system.

SUMMARY OF THE INVENTION

The foregoing needs, and other needs that will become apparent from the following description, are achieved by the present invention, which comprises, in one aspect, a method and a system for efficiently interpreting computer programs that require invocation of an interpreter. A name of a program to be interpreted or executed is received, with zero or more arguments, at an interface client element. The interface client element may be implemented as a compact software element that is invoked using a command-line command. As a result, invocation of the interface client element consumes relatively few resources and has low overhead. The interface client passes the program name and arguments to a continuously running server process that includes a continuously running or persistent interpreter. Alternatively, the server process and interpreter are separate, and the server process forwards the program name and arguments to a separate interpreter. The server process provides the name and arguments to the interpreter, which interprets the program. One or more result values based on results of interpretation of the computer program by the interpreter are received and passed back to the interface client. In this way, programs that need to be started frequently can be repeatedly started without incurring overhead involved in successively restarting the interpreter for each invocation of the program.

In one specific embodiment, a persistent JAVA Virtual Machine is pre-started either manually or automatically by one or more clients. The persistent JAVA Virtual Machine remains in memory after finishing processing the request from the client and continues to accept new requests, thus eliminating the recurring costs of startup. A client element can be invoked either by command line or from one or more CGI scripts from a browser. The client receives the information normally found in a command-line invocation of the JAVA Virtual Machine and routes it to a server, which is written in JAVA. The server, in turn, dynamically executes the program in the same JAVA Virtual Machine in which it runs. Thus, certain embodiments provide a generic JAVA Virtual Machine server that can handle various different JAVA applications and offers a command-line interface.

Embodiments are applicable not only to JAVA, but to any computer programming language that can be used to write the control server, and that can dynamically instantiate and execute program code.

In other aspects, the invention encompasses a computer-readable medium, apparatus and system configured to carry out the foregoing steps. Other aspects of the invention will become apparent from the following description and claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for efficiently executing a computer program is described. In the following description, for the purposes of explanation, numerous specific details are set forth in order to provide a thorough understanding of the present invention. It will be apparent, however, to one skilled in the art that the present invention may be practiced without these specific details. Well-known structures and devices are shown in block diagram form in order to avoid unnecessarily obscuring the present invention.

Embodiments are discussed in the following description in sections conforming to the following outline:

5. STRUCTURAL OVERVIEW
   6. FUNCTIONAL OVERVIEW
      a. STARTING THE SERVERS
      b. INTERPRETING A COMPUTER PROGRAM
   7. HARDWARE OVERVIEW
   8. EXTENSIONS AND ALTERNATIVES 1. Structural Overview Efficient interpretation of a computer program can be carried out according to several embodiments of the present invention. For example, a program can be interpreted in a configuration where the client and the server execute in the same physical computer. Alternatively, a program can be interpreted in a distributed environment having multiple clients and servers, where each client can communicate with any one of the servers. In one specific embodiment, a JAVA server and JAVA Virtual Machine facilitate interpretation of JAVA programs that have been pre-processed into byte code format.

Figure 1A:
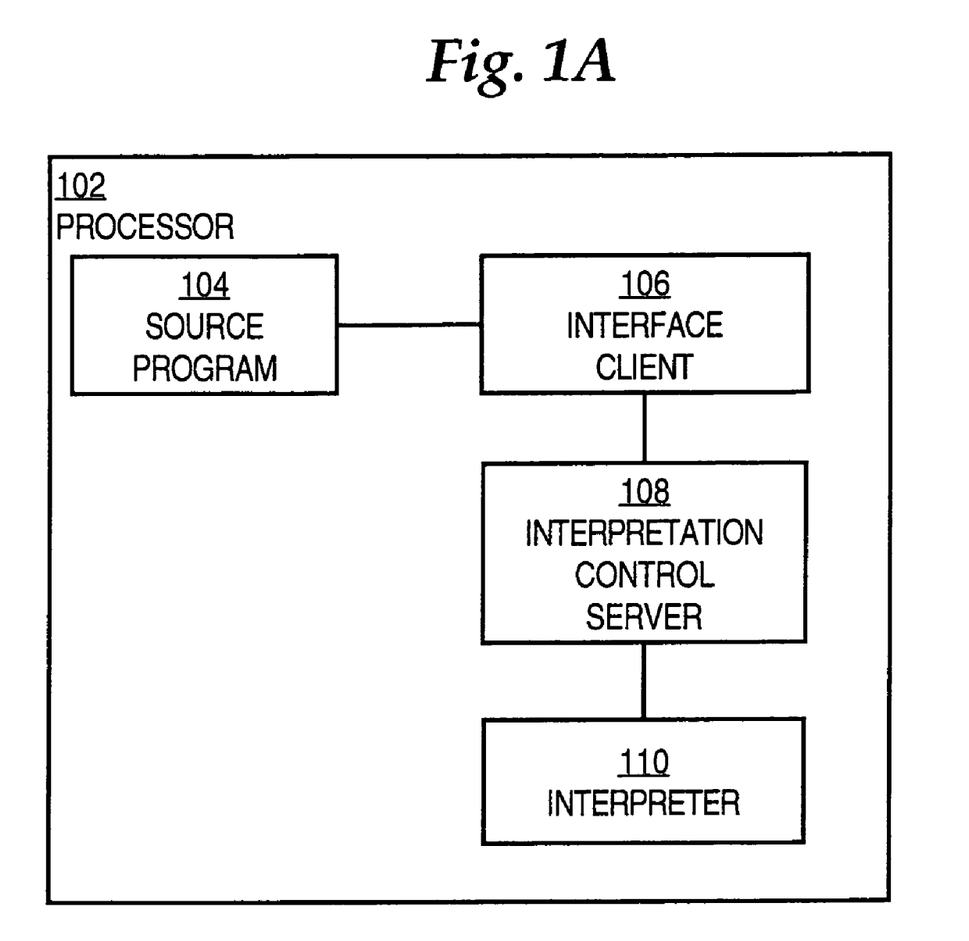
FIG. 1A is a block diagram of an example of the structure of a system for efficiently starting up an interpreted computer program.

FIG. 1A is a block diagram of an example of the structure of a system for efficiently interpreting a computer program.

In general, a system for efficiently interpreting a computer program comprises an interface client 106, an interpretation control server 108, and an interpreter 110. Interface client 106 receives program source instructions from a source program 104. Interface client 106 is communicatively coupled to interpretation control server 108, which in turn is communicatively coupled to interpreter 110. Intercommunication among interface client 106, interpretation control server 108, and interpreter 110 may occur through programmatic function calls, use of distributed object mechanisms, network socket communication, etc. Server 108 and interpreter 110 may run in the same process and may run as a single program without special communication mechanisms. For example, the interpretation control server itself may be a program that is run by the interpreter, and when server 108 receives a request from the interface client the interpretation control server 108 dynamically instantiates or executes the class within its own environment.

In one embodiment, interface client 106 receives the name of one or more class files that contain source instructions. In response to receiving the instructions or a file name, interface client 106 informs interpretation control server 108 that the named program or the instructions are ready for interpretation, and passes them to it. In response, interpretation control server 108 passes the instructions or file to interpreter 110, which interprets them.

Figure 1B:
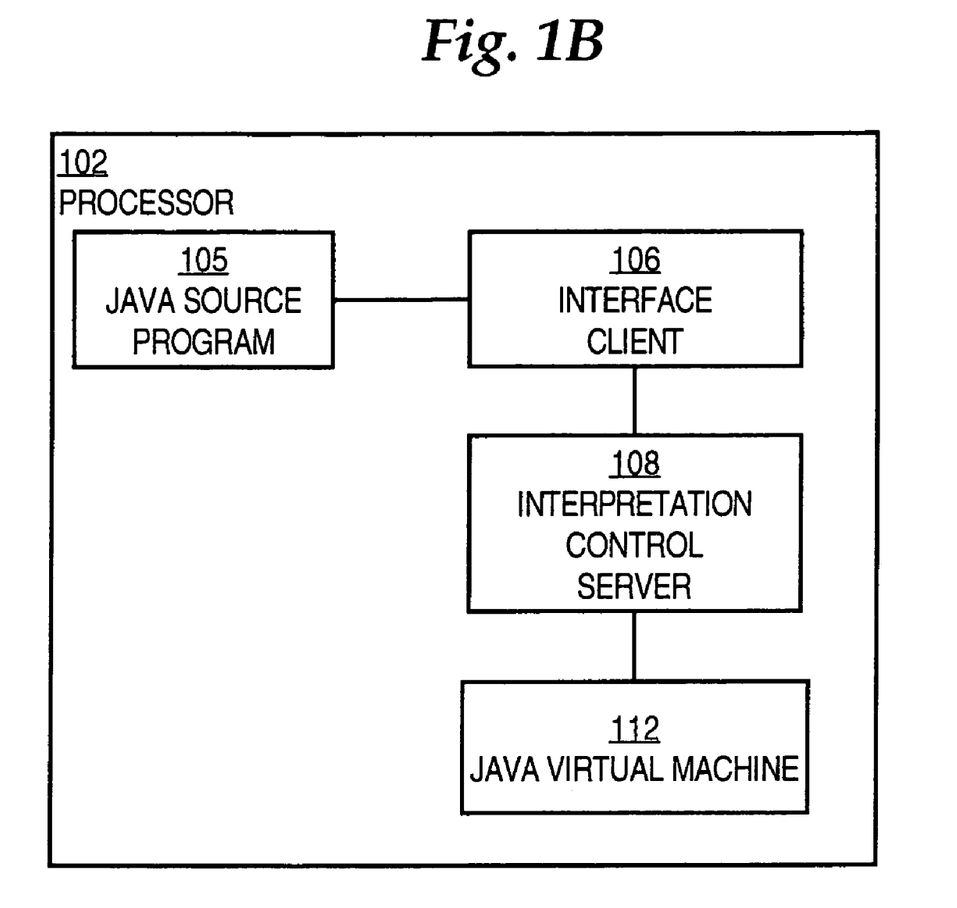
FIG. 1B is a block diagram of a second example of the structure of a system for efficiently starting up an interpreted computer program.

FIG. 1B is a block diagram of a second example of the structure of a system for efficiently interpreting a computer program. Interface client 106 receives the name of the JAVA source program 105 to execute, and notifies interpretation control server 108. The JAVA source program 105 may comprise one or more JAVA class files; where there are multiple files, the name of the main class as an entry point to the program is passed to the interface client 106. In response, interpretation control server 108 contacts JAVA virtual machine 112 and provides the class files to the JAVA virtual machine, which interprets them. In one specific embodiment, the control server executes the class in its own environment.

Communication of JAVA source programs or class files to interface client 106 may occur by invoking interface client in executable form from a command-line interface of processor 102. In one embodiment, interface client 106 is invoked to run JAVA classes with a command having the form:

> Jstart<class_name> param1 param2 where "Jstart" is the name of a specific program implementation of interface client 106. Any desired name for the client may be used. In response to command-line invocation, interface client 106 invokes interpretation control server 108 as further described herein. Use of command-line invocation gives a programmer, developer or administrator control over the timing of invocation and the naming of the classes to be interpreted.

Figure 2:
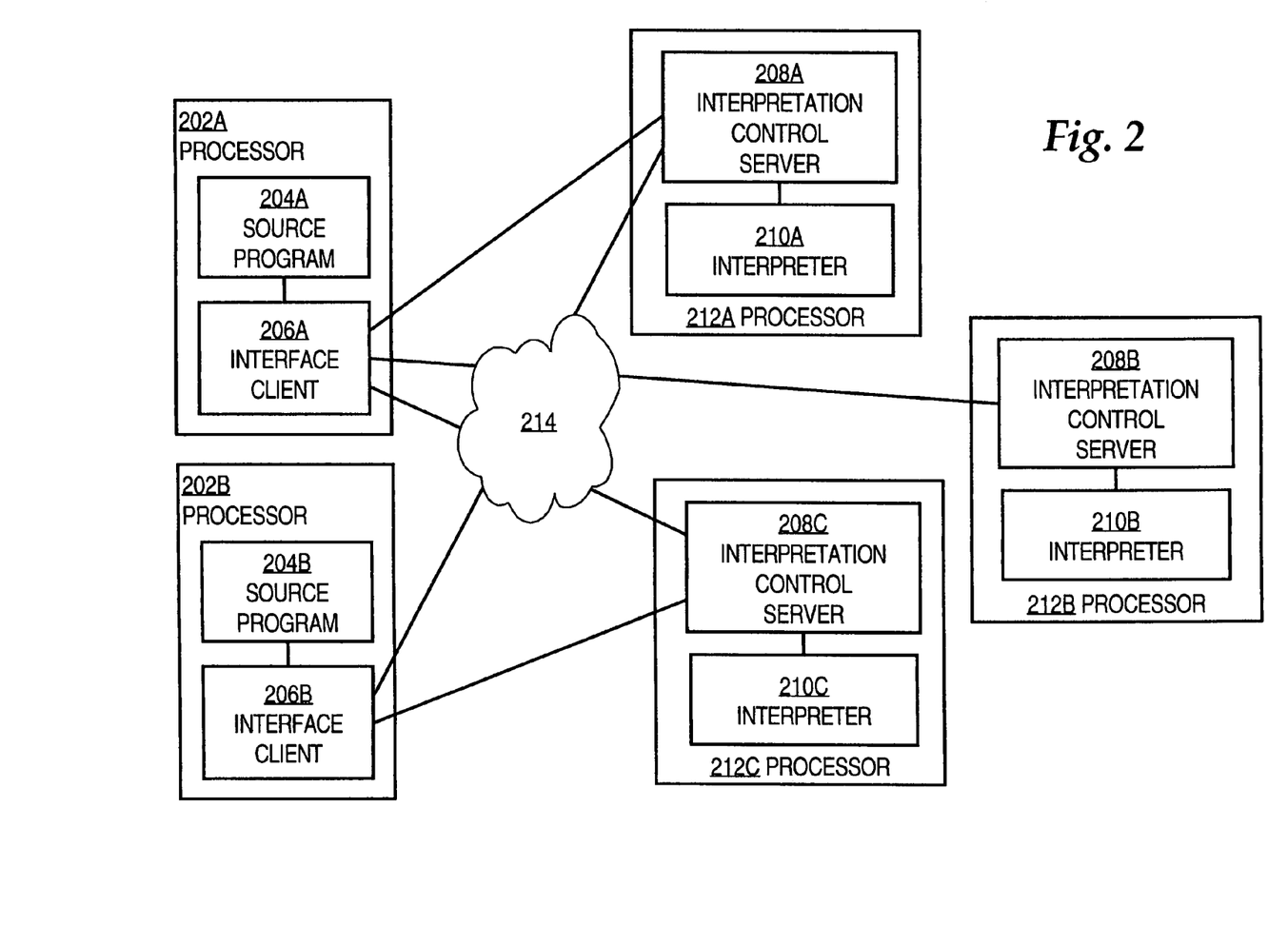
FIG. 2 is a block diagram of a system for efficiently starting up interpreted computer programs in a distributed environment.

The embodiments of FIG. 1A, FIG. 1B use a single processor 102 that stores and executes the interface client, interpretation control server, and interpreter. However, a single-machine implementation is not required. FIG. 2 is a block diagram of a system for efficiently interpreting computer programs in a distributed environment.

Referring now to FIG. 2, a system for efficiently interpreting computer programs in a distributed environment includes one or more first processors 202A, 202B that are communicatively coupled to one or more second processors 212A, 212B, 212C directly or by means of one or more intervening networks 214. Direct connections may in fact be indirect through a local area network or other communication means. Network 214 may comprise one or more LANs, WANs, internetworks, multiple internetworks that span wide areas such as the Internet, etc.

Each first processor 202A, 202B includes a source program 204A, 204B and an interface client 206A, 206B. Source programs may comprise JAVA classes, complete applications in a high-level programming language, or other source text. Interface clients 206A, 206B are executable applications that can be invoked using a command line facility of an operating system of the first processors 202A, 202B.

The source program may actually reside either on the client or the server. If just the class or program name is used, then the server needs to be able to "get" to the source program, which is made available either on the server machine, or by using a mechanism for retrieving the program from the client. Alternatively, the actual source program files are passed to the server. In this approach, the interface client reads the files containing byte code and transfers them over the network to the control server. This approach is well suited to small programs or in an environment with a fast network, so that the source program can be quickly transferred over network to the server.

Each second processor 212A, 212B, 212C includes an interpretation control server 208A, 208B, 208C and a corresponding interpreter 210A, 2101B, 210C.

Each of the interface clients 206A, 206B of the first processors may select from among the second processors 212A, 212B, 212C for purposes of having source programs 204A, 204B interpreted. In one embodiment, a user may enter a command on any one of the first processors 202A, 202B that names one of the source programs 204A, 204B and requests interpretation. The interface client 206A, 206B of the first processor is invoked and executes, and then selects one of the processors 212A, 212B, 212C for interpretation of the associated source program. In response to receiving a request to interpret a source program, the selected interpretation control server passes the source program to the interpreter for interpretation.

Source program 104, or JAVA classes, may be stored in any of several locations with respect to processor 102, first processors 202A, 202B, or second processors 212A, 212B, 212C. For example, source program 104 may be stored on a persistent storage device (e.g., disk) of processor 102. In the example of FIG. 1B, the source JAVA classes may be stored on the machine that hosts the interpretation control server and JAVA Virtual Machine. Alternatively, the source programs or classes could be stored on shared disk. If the source programs or classes are stored on the machine that hosts the interface client, then the interface client sends any pre-compiled, byte code class files that are associated with the source programs or classes at the same time that it sends the name and arguments of the source programs or classes to the interpretation control server. If the source programs or classes are on shared disk, the interpretation control server links to them dynamically and provides them to the interpreter.

In any of the embodiments of FIG. 1A, FIG. 1B, FIG. 2, communication of commands and information between an interface client and an interpretation control server may use any means of communication that are provided by the underlying operating system of the machine(s) that host the interface client and interpretation control server. Examples of suitable means of communication among the client processes and the server processes include named pipes as well as shared memory, sockets, and Remote Procedure Call (RPC). The availability of such multiple communication means enables one or more interface clients and one or more interpretation control servers to utilize resources of multiple machines, because the communication means do not require client and server to be located on the same machine. For example, different programs or different invocations of the same program can share database handles, reducing overhead involved when multiple programs need to open the database. As a result, client and server processes may be separated in a distributed fashion.

Further, one instance of the JAVA Virtual Machine may be shared among multiple source programs that are concurrently interpreted. The user can run any number of concurrent processes on one JAVA Virtual Machine, thereby eliminating the need for extra server processes, which consume additional startup overhead, degrade start-up performance and hinder scalability. This is accomplished by running each concurrent program in a separate execution thread.

In an embodiment, the interpretation control server is implemented in the JAVA language, and the standard JAVA Virtual machine serves as the interpreter for both the interpretation control server and the source programs that the control server invokes based on requests from the interface client. The JAVA Virtual Machine allows dynamic execution of JAVA programs, i.e., the name of the program or class does not have to be known at the time that the JAVA Virtual Machine is started up. No modification or recompilation of the JAVA Virtual Machine is necessary. Unlike prior approaches such as SpeedyCGI, the interpretation control element runs on an instance of the interpreter. In addition, in an alternative embodiment, the interpretation control server and the interpreter may be implemented in the form of an integral software element. Thus, in one example embodiment, the interpretation control server uses the same virtual machine for interpreting the source program as the one on which it itself runs.

Embodiments are applicable not only to JAVA but to any computer programming language that can be used to write the interpretation control server, and that can dynamically instantiate and execute program code.

2. Functional Overview

A description of processes involved in starting an interpretation control server and an interpreter, and using them in cooperation with interface clients to interpret source programs, is now provided. For purposes of illustrating an example, this description is made in reference to FIG. 2. However, the functional description provided herein is equally applicable to the example arrangements of FIG. 1A, FIG. 1B.

2.1 Starting the Servers

Interpretation control servers 208A, 208B, 208C may be started or initialized in advance of interpretation processing, either manually or using automatic startup processes that initiate on demand. For example, interface clients 206A, 206B may be configured with code for issuing a query to a selected interpretation control server to determine whether the interpretation control server is then currently operating. If the interpretation control server is found to be inactive at the time an interpretation process is needed, the interface client can issue a command to processor 212 to invoke or start the interpretation control server.

In the specific case of FIG. 2, in which each interpretation control server resides on and is executed on a processor other than the processor that hosts the interface client, an interface client can start an interpretation control server by means of a remote procedure call or any other mechanism. If the interpretation control server is hosted on the same machine as the interface client, the client starts the server directly.

Figure 3:
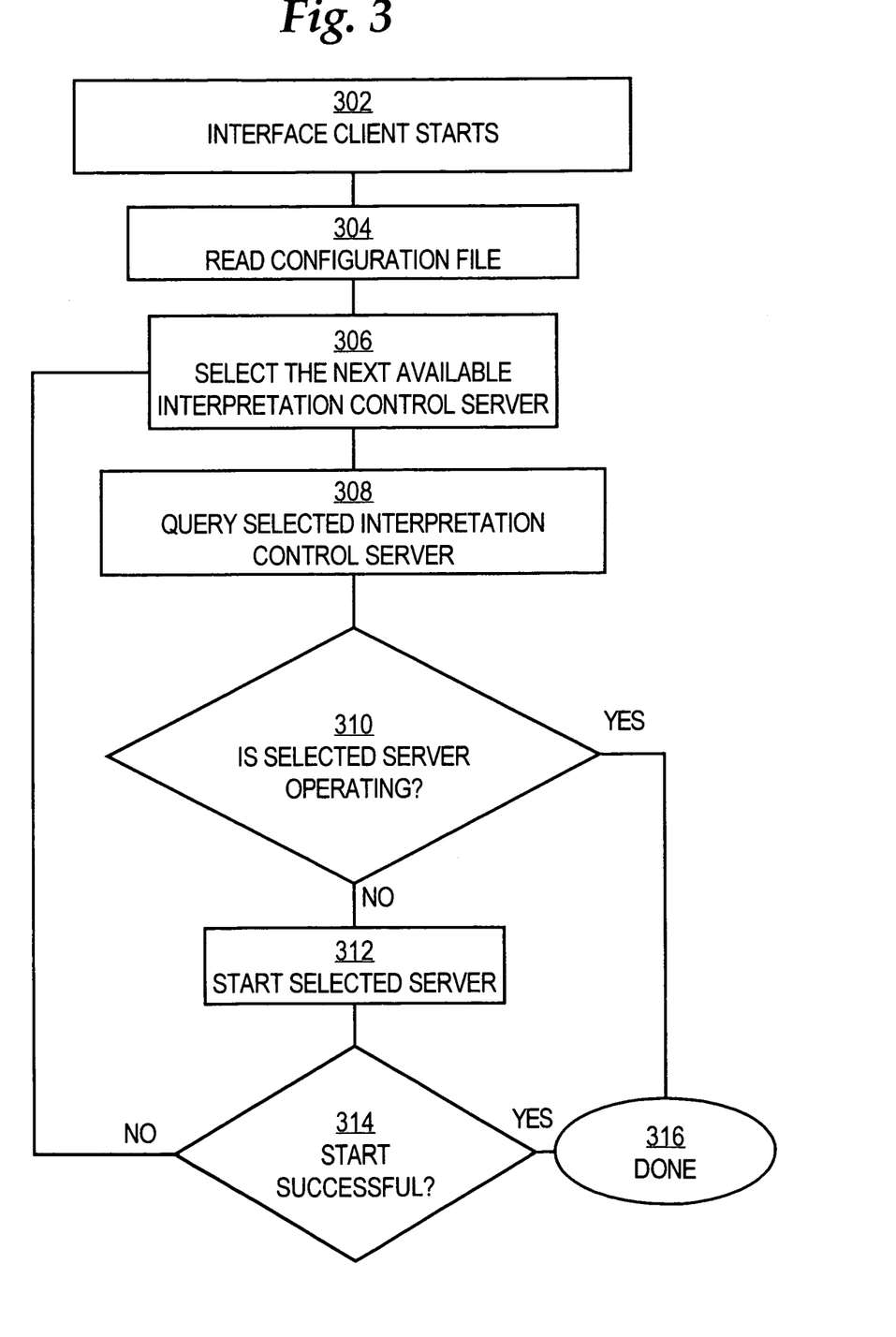
FIG. 3 is a flow diagram illustrating an example of a process that an interface client may use to automatically start an interpretation control server.

FIG. 3 is a flow diagram of a process of automatically starting an interpretation control server. In one embodiment, JAVA interpretation control servers may be started automatically by an interface client using the process of FIG. 3. The process of FIG. 3 may be carried out at any time, including at the time a JAVA application is started.

In step 302, an interface client starts operating. In one embodiment, a user starts an interface client by entering a command-line command, such as the name of the interface client and one or more names of classes for interpretation. In step 304, the interface client reads a configuration file as part of its initialization processing. The configuration file contains information that identifies one or more candidate interpretation control servers that can be used for interpretation. For example, the configuration file may comprise a list of one or more IP addresses and server process names for known or available interpretation control servers.

In step 306, the next available interpretation control server is selected. For example, an interface client scans the list of candidate interpretation control servers and selects one according to pre-determined criteria, e.g., the server that is geographically closest, within the same sub domain as indicated by a comparison of an IP address of the processor that hosts the interface client and the IP address of the servers, etc.

In block 308, a query is issued to the selected interpretation control server. For example, the interface client issues a query to the selected interpretation control server to determine whether it is then currently active. If the selected interpretation control server is then currently operating, as tested in block 310, then control passes to block 316 and the process of FIG. 3 concludes. If the selected interpretation control server is not then currently operating, then in block 312 the interface client automatically attempts to start the selected interpretation control server, e.g., by remote procedure call.

Thereafter, in block 314, the selected interpretation control server is queried to determine whether the startup was successful. If the startup was successful, then control passes to block 316 in which processing is complete. If startup is not successful, then the next available interpretation control server is selected in block 306. Although it is not illustrated in FIG. 3, appropriate processing may be carried out when all candidate interpretation control servers have been contacted without a successful startup. For example, an error can be thrown.

2.2 Interpreting a Computer Program

A method of efficiently interpreting a computer program is now described. In one embodiment, such a method addresses the specific problem of performance degradation resulting from re-starting the JAVA Virtual Machine frequently for program that is executed repeatedly. Further, the method improves efficiency involved in repeatedly starting up small programs where the startup overhead may exceed the resources needed by the program to execute.

Figure 4:
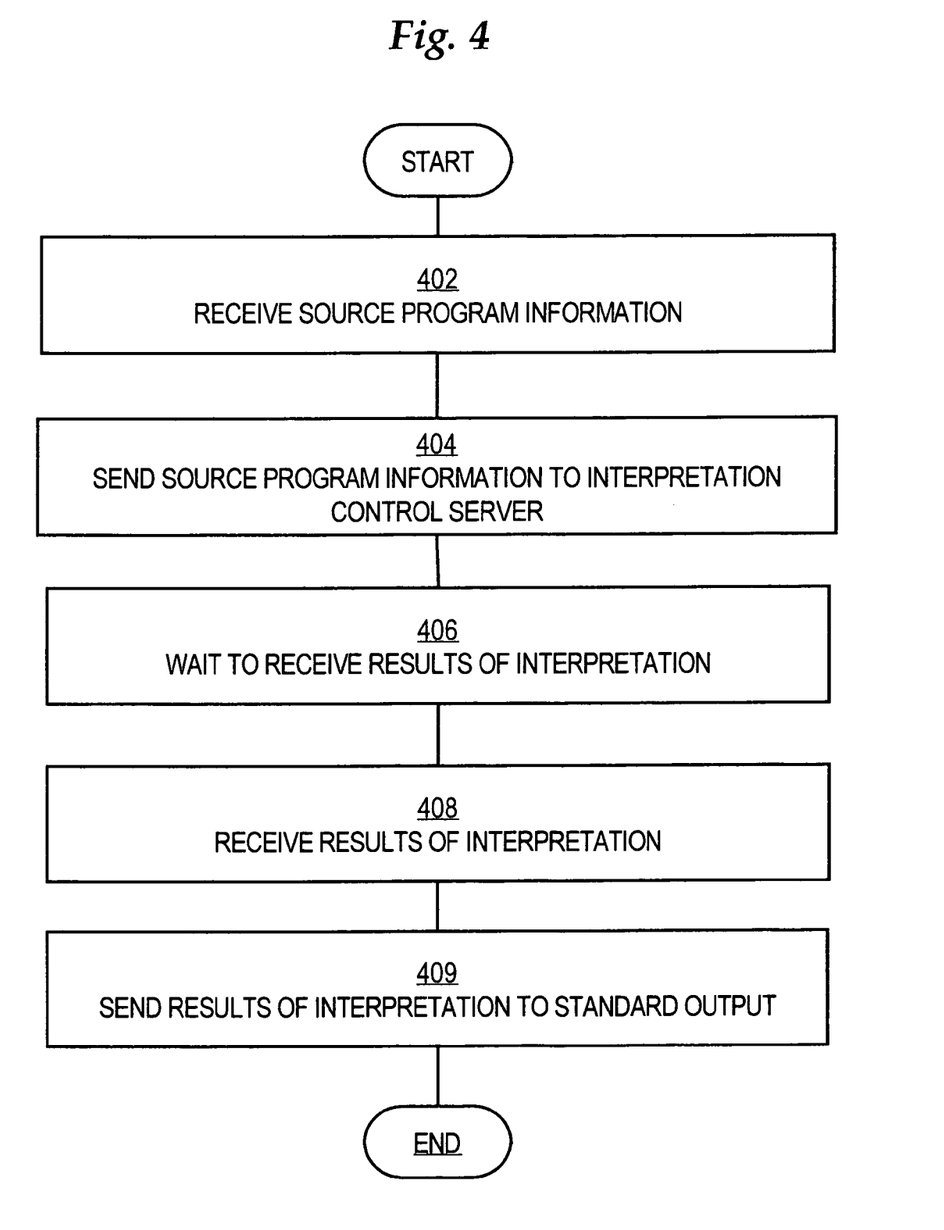
FIG. 4 is a flow diagram showing a process of efficiently interpreting a computer program.

FIG. 4 is a flow diagram of an example of a process of efficiently interpreting a computer program, expressed with respect to steps carried out by an interface client. In block 402, source program information is received. Block 402 may include invoking the interface client from a command line that includes a name of a source program and one or more arguments. The arguments are values of zero or more parameters of the type normally received directly by the program.

In block 404, the source program information is sent to an interpretation control server. In block 406, the process waits to receive one or more results of interpretation of the source program by an interpreter that is associated with the interpretation control server. Such results are generated by the interpreter, which may dynamically invoke a named class or other source program information. Alternatively, the program itself generates such results. For example, if the program invokes a method on a class that returns a string, the string is returned to the interface client. If the method returns nothing, which can be normal, then the interpreter simply returns a status value such as "SUCCESS" or "ERROR".

In block 408, the results of interpretation are received. As shown by block 409, the results of interpretation are printed to the standard output device of the console from which the interface client was invoked. Printing to the standard output device may result in causing the results of interpretation to be displayed in a screen display.

Figure 5:
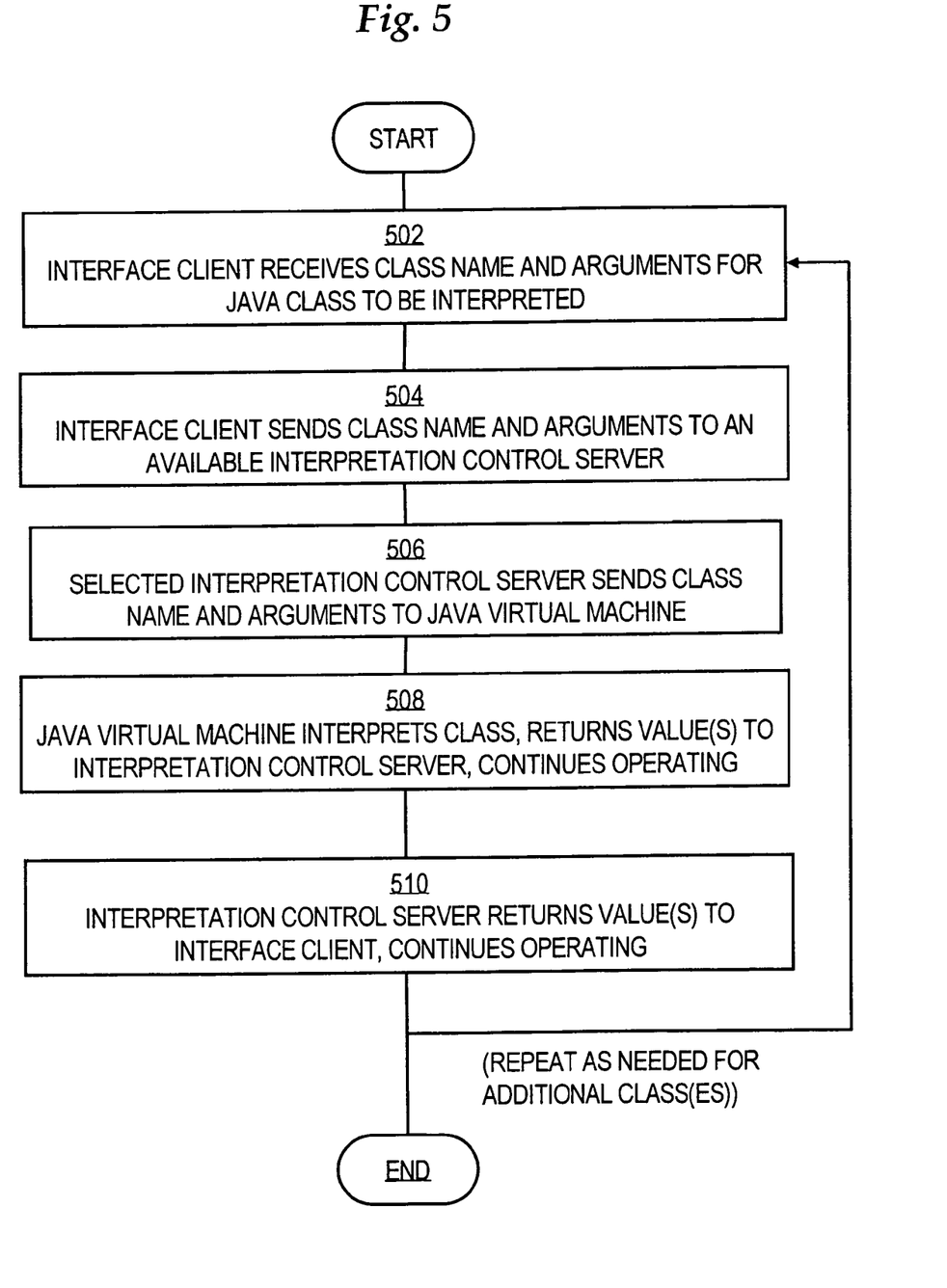
FIG. 5 is a flow diagram illustrating steps performed to efficiently interpret a JAVA_source program.

FIG. 5 is a flow diagram of an example of a process of efficiently interpreting a computer program, for the specific context of interpreting JAVA programs.

In block 502, an interface client receives a class name and one or more arguments for a JAVA class to be interpreted. Optionally, the interface client also receives the name of a method to be invoked. In one embodiment, if no method name is provided, then a predefined method (such as "main( )") is invoked.

In block 504, the client sends the JAVA class name and the arguments to an available interpretation control server. Block 504 may involve selection of an available interpretation control server using the technique of FIG. 3. In another embodiment, the interface client is configured to automatically start server processes on multiple machines. As a result, the system can implement load distribution such that the interface client selects one among a plurality of available interpretation control servers or interpreters. In this embodiment, block 504 may involve selection of one of a plurality of interpretation control servers based on the then-current load of the servers, or by using a round-robin approach. In a related embodiment, the interface client and interpretation control server exchange information about the number of source programs that are concurrently running on the server or with the interpreter. The interface client receives this information for all interpretation control servers in the system. Based on such load information, the interface client can select different interpretation control servers to serve successive interpretation requests, thereby balancing processing load across all the servers.

In block 506, the selected interpretation control server receives the JAVA class name and arguments, and then sends them to the JAVA Virtual Machine. In one embodiment, the interpretation control server dynamically invokes a specified or default method on the class whose name was passed to it. It also passes the parameters to the method that was passed to it. In this approach, the interpretation control server has the class that is being invoked on its machine and the JAVA Virtual Machine is pre-configured to know where to find it. In another approach, the actual byte code of the class is passed to the control server, the class file is then assembled, and then the class file is dynamically instantiated.

In block 508, the JAVA Virtual Machine interprets the named class using the supplied arguments, and returns one or more values to the interpretation control server as results of the interpretation. For example, the JAVA Virtual Machine dynamically invokes a method on the class for the class name that was provided, and returns the results of running the method to the interface client. Alternatively, interpretation of the named class may result in updating a database, writing information to a data file, or other input and output operations; returning values or return codes is not required. In this case, the interpretation control server waits until the method finishes execution and then returns a "SUCCESS" message to the interface client, so that client knows that program running was completed.

In block 510, the interpretation control server returns the received values to the interface client. The process may be repeated any number of times as needed to interpret other class files.

After interpreting the named class, i.e., after completion of both block 508 and block 510, the JAVA Virtual Machine and the interpretation control server continue running and remain ready to serve other client requests. The interface client may terminate.

In this configuration, a class can be executed with little start-up overhead. In particular, once the interpretation control server and interpreter processes are started, they stay in memory; further, the time required for start-up of the interface client program is minimal because it is written as a compact software element in a language that does not require the overhead of the interpreter (such as C or C++). In addition, any JAVA Virtual Machine that supports dynamic class instantiation may be used as the interpreter without any modifications to the JAVA Virtual Machine.

In one alternative embodiment, the command line command that is used to invoke the process can receive one or more additional parameters. In another embodiment, the interpretation control servers are pre-started, and therefore the process omits logic relating to determining whether an interpretation control server is available and running. In still another alternative, the JAVA class source file(s) do not reside on the interpretation control server, but reside on the client or another location. In this case, the process includes additional logic to enable the client to retrieve the JAVA code associated with the JAVA class and send it along with the JAVA class name and arguments as part of block 504.

Further, in this arrangement, multiple instances of interpreter 210A, 210B, 210C collectively can interpret multiple programs and/or processes concurrently.

Using the disclosed system, the JAVA Virtual Machine is used in off-the-shelf form and does not require modification or recompilation.

3. Hardware Overview

Figure 6:
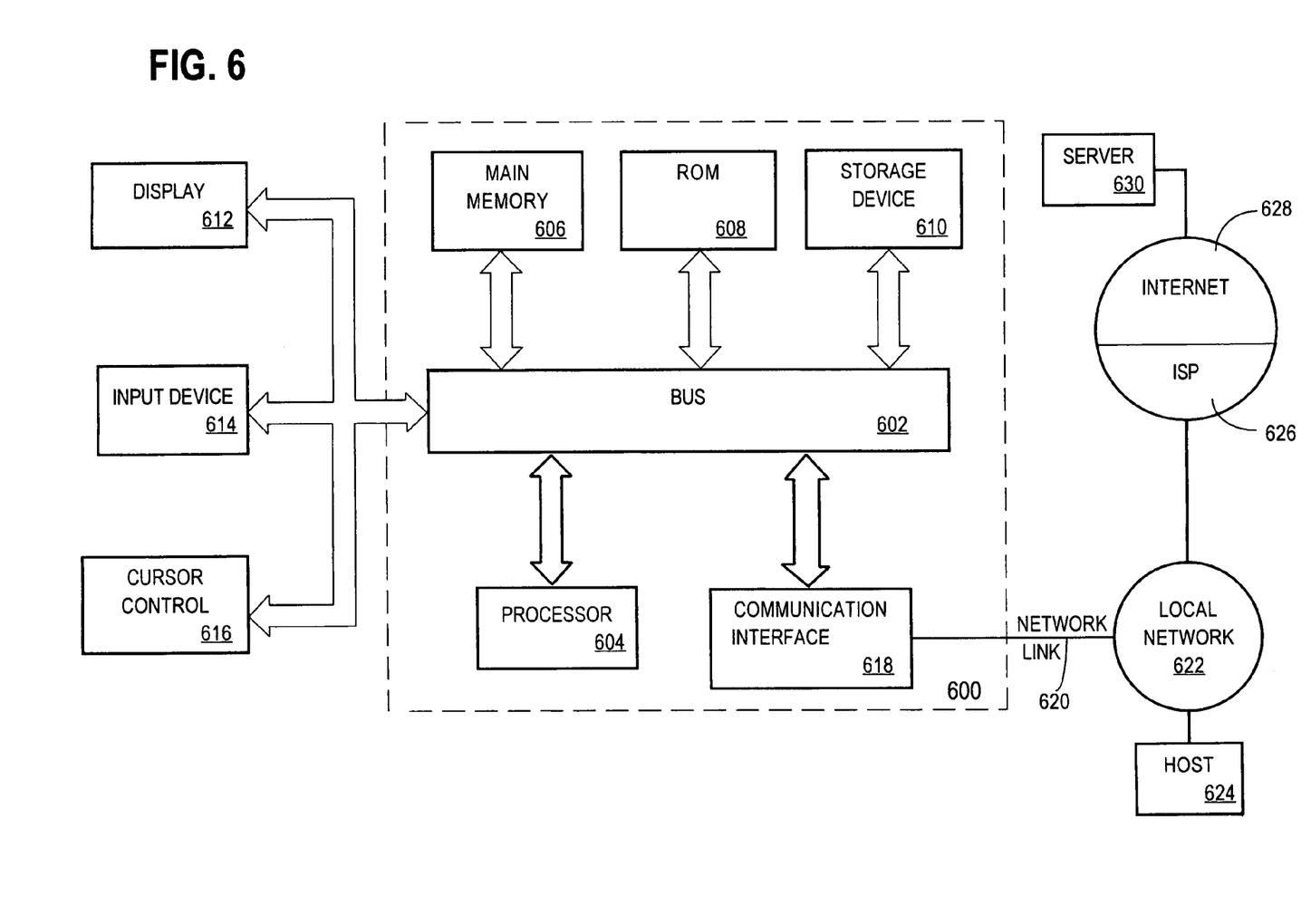
FIG. 6 is a block diagram of a computer system that may be used to implement embodiments.

FIG. 6 is a block diagram that illustrates a computer system 600 upon which an embodiment of the invention may be implemented.

Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for improving startup efficiency of interpreted computer programs. According to one embodiment of the invention, improving startup efficiency of interpreted computer programs is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for improving startup efficiency of interpreted computer programs as described herein.

Processor 604 may execute the received code as it is received, and/or stored in storage device 610, or other non-volatile storage for later execution. In this manner, computer system 600 may obtain application code in the form of a carrier wave.

4. Extensions and Alternatives

A method and system for efficiently interpreting a computer program has been described in which interpreted programs are invoked from a command line and have a fast start-up time. Multiple programs may be run concurrently using one interpreter. Scalability and availability benefits are achieved by enabling interpreted programs to share resources such as database connections, distribute load across multiple interpreter processes, and select an interpreter based on the then-current load of a plurality of interpreters.

Using the disclosed approaches, a software developer can write relatively small programs that can be executed from the command line. Writing such programs in JAVA is currently impractical in many cases as a result of the slow start-up of JAVA applications, and the overhead of starting multiple JAVA Virtual Machines in the event that two programs need to be started substantially concurrently. Using the disclosed approaches, in this context start-up time is virtually eliminated and multiple programs can re-use the same JAVA Virtual Machine process.

The disclosed approaches are also applicable to execution of CGI scripts that can execute fast and can scale as the number of requests to the server increases. In this alternative, the interface client is a CGI application that is invoked by a Web server. In contrast, if CGI is used to invoke an application in the JAVA Virtual Machine directly, then the start-up overhead is too great and the overall solution is non-scalable because of the large amount of memory consumed by each JAVA Virtual Machine process and the CPU overhead required for starting up each instance of the JAVA Virtual Machine.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of interpreting a computer program wherein the computer program requires invocation of an interpreter for execution, the method comprising the computer-implemented steps of:
   receiving a name and zero or more arguments for the computer program from an interface client by an interpretation control server, wherein said interpretation control server is a program written in an interpreted language run by an instance of an interpreter, said instance providing an environment for the interpretation control server;
   requesting the instance of the interpreter being used to run the interpretation control server to dynamically instantiate a method on the named computer program using the zero or more arguments, said method being instantiated within the environment of the interpretation control server;
   receiving one or more result values based on results of interpretation of the computer program by the interpreter;
   providing the one or more results of interpretation to the interface client.

2. A method as recited in claim 1, wherein receiving a name and zero or more arguments includes the steps of receiving the name and zero or more arguments from a command-line invocation of the interface client.

3. A method as recited in claim 2, wherein said interpreter is a Virtual Machine process, and wherein receiving a name and zero or more arguments includes the steps of receiving a class name and zero or more interpretation parameter values for use by an instance of the Virtual Machine process.

4. A method as recited in claim 1, wherein receiving a name and zero or more arguments includes the steps of:
   executing an interface client that receives the name and the zero or more arguments in a command line invocation of the interface client;
   extracting the name and the zero or more arguments from the command line; providing the name and the zero or more arguments from the interface client to an interpretation control server, wherein said interpretation control server is a program written in an interpreted language run by an instance of an interpreter, said instance providing an environment for the interpretation control server.

5. A method as recited in claim 1, farther comprising the steps of iteratively repeating all prior steps for each of a plurality of class files that represent source code for an application program such that the entire program is interpreted within the environment of the interpretation control server without restarting the interpreter in successive iterations.

6. A method as recited in claim 1, wherein the step of receiving a name and zero or more arguments for the computer program includes the steps of selecting the interpretation control server from among one or more of a plurality of interpretation control servers.

7. A method as recited in claim 1, wherein the step of receiving a name and zero or more arguments for the computer program from an interface client by an interpretation control server comprises the steps of:
   initiating a plurality of interpretation control servers, each said interpretation control server being run by a separate instance of an interpreter;
   receiving load-balancing information representing then-current processing load levels of each of the interpretation control servers;
   selecting the interpretation control server from among one or more of the plurality of interpretation control servers based on the load balancing information.

8. A method as recited in claim 1, further comprising the steps of continuing operation of the interpretation control server and the instance of the interpreter after providing the one or more result values to the interface client.

9. A method of interpreting a computer application comprising one or more class files that require invocation of a Virtual Machine for interpretation thereof, the method comprising the computer-implemented steps of:
   receiving a class name and zero or more arguments associated with the computer application from an interface client at an interpretation control server that interfaces the interface client to a Virtual Machine, wherein said interpretation control server is a programs written in an interpreted language executed by an instance of the Virtual Machine, said instance providing an environment for the interpretation control server;
   providing the class name and the zero or more arguments to the instance of the Virtual Machine for interpretation within the environment of the interpretation control server;
   receiving one or more result values based on results of interpretation of the computer application by the Virtual Machine;
   providing the one or more results of interpretation to the interface client; and
   continuing operation of the interpretation control server and the instance of the Virtual Machine after providing the one or more result values to the interface client.

10. A method as recited in claim 9, wherein receiving a class name and zero or more arguments includes the steps of receiving the name and zero or more arguments from a command-line invocation of the interface client.

11. A method as recited in claim 10, wherein receiving a class name and zero or more arguments includes the steps of receiving a class name and zero or more interpretation parameter values for use by the Virtual Machine.

12. A method as recited in claim 9, wherein receiving a class name and zero or more arguments includes the steps of:

executing an interface client that receives the class name and the zero or more arguments in a command line invocation of the interface client;

extracting the class name and the zero or more arguments from the command line;

providing the class name and the zero or more arguments from the interface client to an interpretation control server that interfaces the interface client to a Virtual Machine; wherein said interpretation control server is a program written in an interpreted language executed by an instance of the Virtual Machine, said instance providing an environment for the interpretation control server.

13. A method as recited in claim 9, further comprising the steps of iteratively repeating all prior steps for each of a plurality of class files that represent source code for an application program such that the entire program is interpreted within the environment of the interpretation control server without restarting the Virtual Machine for each of the class files in successive iterations.

14. A method as recited in claim 9, wherein the step of receiving a class name and zero or more arguments includes the steps of selecting the interpretation control server from among one or more of a plurality of interpretation control servers.

15. A method as recited in claim 9, wherein the step of receiving a name and zero or more arguments for the computer application from an interface client by an interpretation control server comprises the steps of;

initiating a plurality of interpretation control servers, each said interpretation control server being executed by a separate instance of a Virtual Machine;

receiving load-balancing information representing then-current processing load levels of each of the interpretation control servers, selecting the interpretation control server from among one or more of the plurality of interpretation control servers based on the load balancing information.

16. A computer-readable volatile or non-volatile storage media medium comprising one or more sequences of instructions for interpreting a computer program wherein the computer program requires invocation of an interpreter for execution, which instructions, when executed by one or more processors, cause the one or more processors to carry out the steps of:

receiving a name and zero or more arguments for the computer program from an interface client by an interpretation control server, wherein said interpretation control server is a program written in an interpreted language, run by an instance of an interpreter, said instance providing an environment for the interpretation control server;

providing the name and the zero or more arguments to the instance of the interpreter;

receiving one or more result values based on results of interpretation of the computer program by the interpreter within the environment of the interpretation control server;

providing the one or more results of interpretation to the interface client.

17. A computer-readable media as recited in claim 16, wherein instructions for receiving a name and zero or more arguments for the computer program cause the one or more processors to receive the name and zero or more arguments from a command-line invocation of the interface client.

18. An apparatus for interpreting a computer program wherein the computer program requires invocation of an interpreter for execution, comprising:

means for receiving a name and zero or more arguments for the computer program from an interface client by an interpretation control server, wherein said interpretation control server is a program written in an interpreted language run by an instance of an interpreter;

means for providing the name and the zero or more arguments to the instance of the interpreter;

means for receiving one or more result values based on results of interpretation of the computer program by the interpreter within the environment of the interpretation control server;

means for providing the one or more results of interpretation to the interface client.

19. An apparatus as recited in claim 18, wherein means for receiving a name and zero or more arguments for the computer program includes means for receiving the name and zero or more arguments from a command-line invocation of the interface client.

20. An apparatus for interpreting a computer program wherein the computer program requires invocation of an interpreter for execution, comprising:

a network interface coupled to a network for receiving command-line information from an interface client therefrom;

one or more processors communicatively coupled to the network interface and configured to receive information therefrom;

one or more stored sequences of instructions for interpreting the computer program by an interpretation control server that is being executed by an instance of an interpreter, said instance providing an environment for the interpretation control server, which, when executed by the one or more processors, cause the one or more processors to carry out the steps of receiving a name and zero or more arguments for the computer program from the interface client through the network interface;

providing the name and the zero or more arguments to the instance of the interpreter executing the interpretation control server;

receiving one or more result values based on results of interpretation of the computer program by the interpreter, within the environment of the interpretation control server;

providing the one or more results of interpretation to the interface client through the network interface.

* * * * *

UNITED STATES PATENT AND TRADEMARK OFFICE
CERTIFICATE OF CORRECTION

PATENT NO. : 6,978,447 B1  Page 1 of 1
DATED : December 20, 2005
INVENTOR(S) : Anton Okmianski It is certified that error appears in the above-identified patent and that said Letters Patent is hereby corrected as shown below:

Column 13,
Line 38, delete "nm" and insert -- run --.

Column 14,
Line 41, delete "programs" and insert -- program --.

Column 15,
Line 9, delete "Machine;" and insert -- Machine, --.
Lines 35-38, delete "servers, selecting the interpretation control server from among one or more of the plurality of interpretation control servers based on the load balancing information." and insert -- servers;
selecting the interpretation control server from among one or more of the plurality of interpretation control servers based on the load balancing information. --.
Line 40, delete "medium".

Signed and Sealed this

Second Day of May, 2006

JON W. DUDAS
*Director of the United States Patent and Trademark Office*